United States Patent
Bakker et al.

(10) Patent No.: US 6,356,696 B1
(45) Date of Patent: Mar. 12, 2002

(54) RADIUS CONTROL ROD

(75) Inventors: John H. Bakker, Cortland, OH (US); Vickey E. Reed, Beaver Falls, PA (US); Joseph Albert Svette, Jr., Newton Falls, OH (US); James E Bankston, Greenville, PA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/510,844

(22) Filed: Feb. 23, 2000

(51) Int. Cl.⁷ .................................................. G02B 6/00
(52) U.S. Cl. ......................... 385/134; 385/147; 385/114
(58) Field of Search ........................... 385/100–114, 147

(56) References Cited

U.S. PATENT DOCUMENTS

| | | | |
|---|---|---|---|
| 4,372,511 A | 2/1983 | Knowles | 248/68 |
| 4,392,344 A | 7/1983 | Gordon et al. | 59/78.1 |
| 4,672,805 A | 6/1987 | Moritz | 59/78.1 |
| 4,769,985 A | 9/1988 | Moritz | 59/78.1 |
| 4,858,424 A | 8/1989 | Loding et al. | 59/78.1 |
| 5,237,640 A | 8/1993 | Pedraza et al. | 385/136 |
| 5,240,209 A | 8/1993 | Kutsch | 248/49 |
| 5,530,787 A | 6/1996 | Arnett | 385/136 |
| 5,640,476 A | 6/1997 | Womack et al. | 385/86 |
| 5,715,348 A | 2/1998 | Falkenberg et al. | 385/135 |
| 5,764,839 A * | 6/1998 | Igl et al. | 385/114 |

* cited by examiner

*Primary Examiner*—Phan T. H. Palmer
(74) *Attorney, Agent, or Firm*—Patrick M. Griffin

(57) ABSTRACT

A control rod adapted to be bundled with a plurality of telecommunication cables to prevent the cables from being bent beyond a predetermined radius. The control rod includes a plurality of flexible control rod sections releasably connected together end-to-end by socket members and male members respectively provided on the ends of adjacent control rod sections. Each control rod section includes a plurality of beads connected together end-to-end by webs of material formed integrally with the adjacent beads.

9 Claims, 2 Drawing Sheets

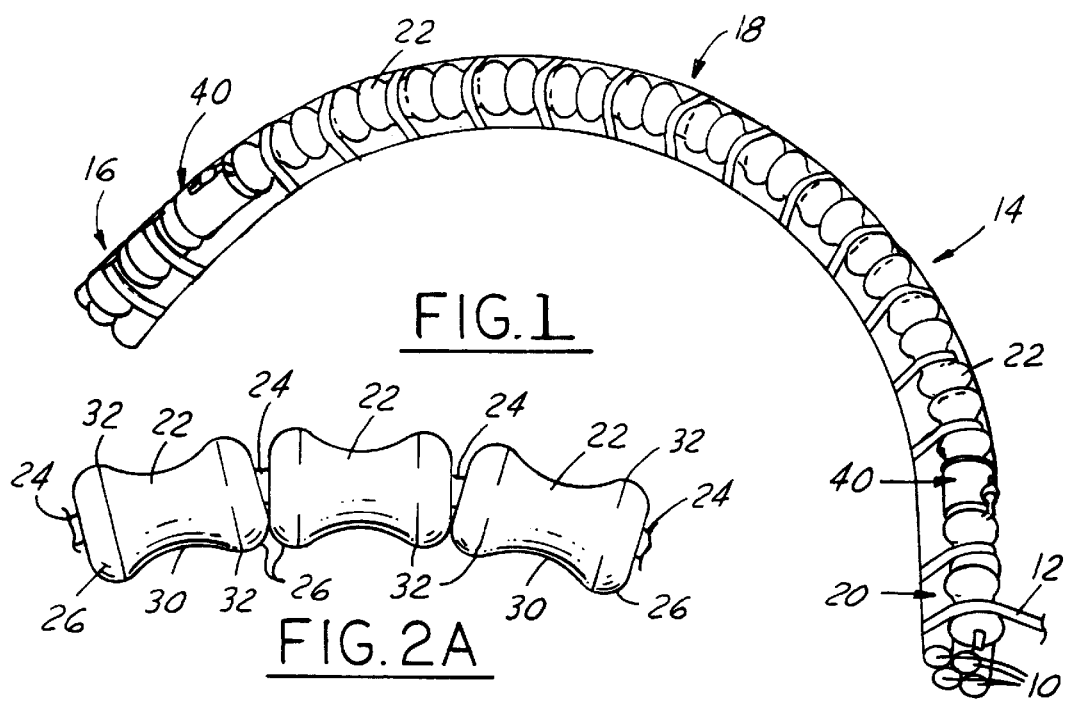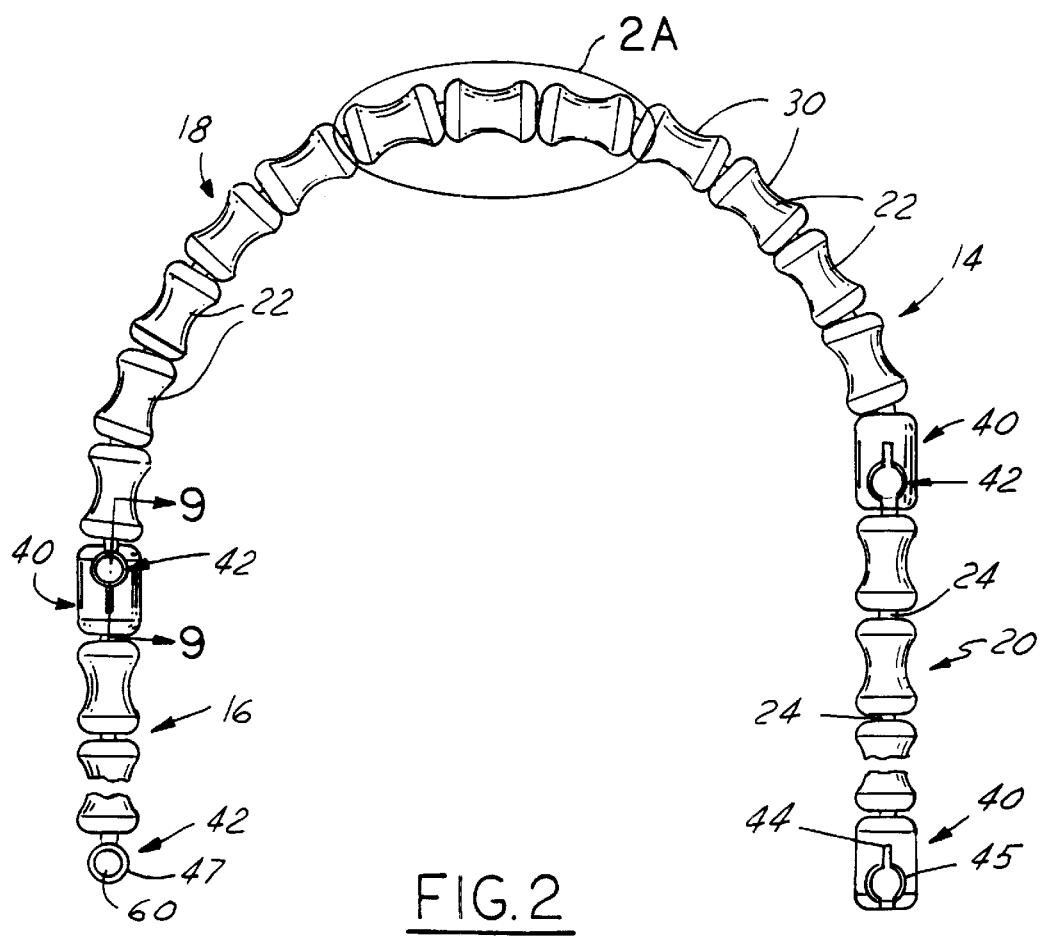

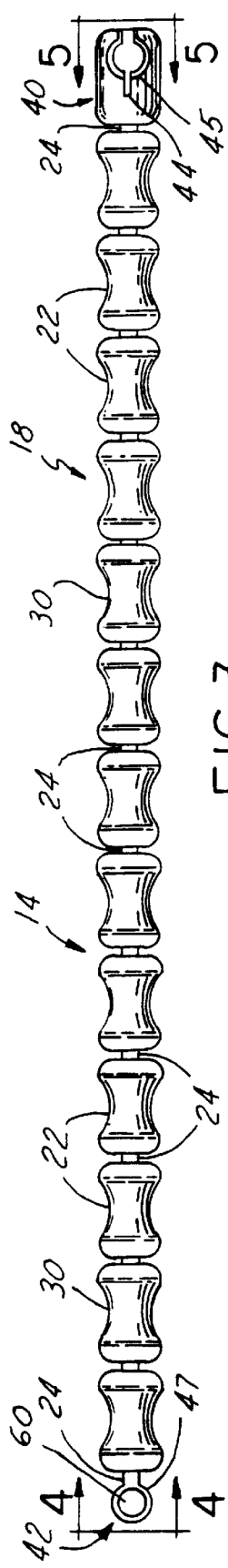
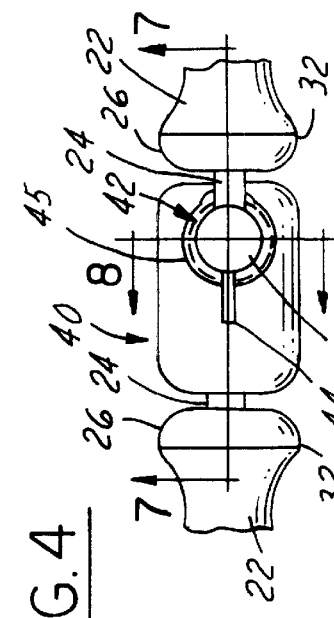
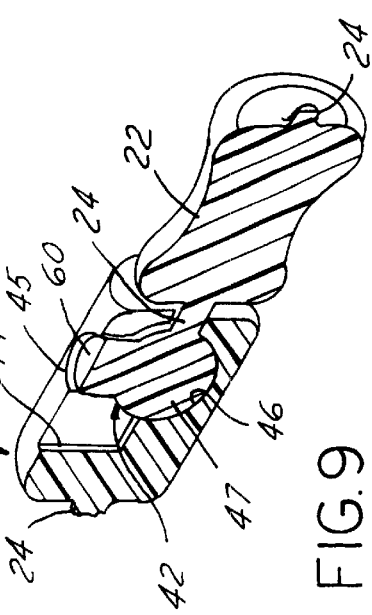
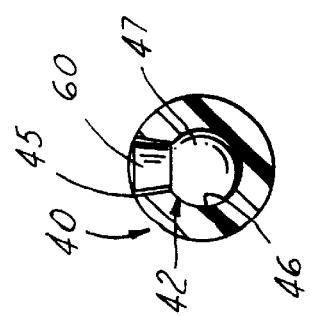

RADIUS CONTROL ROD

This invention relates generally to devices for preventing damage to telecommunication cables and more particularly to a control rod for preventing a bundle of cables from being bent beyond a predetermined minimum radius.

BACKGROUND OF THE INVENTION

Telecommunication cables can be easily damaged by overbending. This is particularly true of fiber optic cables. A damaged cable can result in an interruption of service for as long as it takes to locate the point of the damage and to make repairs. What is needed is a simple means for preventing a bundle of cables from being overbent.

SUMMARY OF THE INVENTION

In accordance with the present invention, a control rod is provided which is adapted to be bundled with a plurality of telecommunication cables to prevent the cables from being bent to less than a predetermined radius. The control rod is flexible and comprises a plurality of beads arranged in a linear series. Preferably the beads are elongated members connected together end-to-end by integral webs of material. The beads and intervening webs are constructed so as to prevent the control rod from being bent to less than a predetermined radius which is preferably on the order of about 25 mm.

The control rod may consist of one control rod section or two or more rod sections connected end-to-end, depending upon the length of the cables. Control rod sections are connected end-to-end by a socket member on an end of the one of the rod sections receiving a male member on an end of another rod section. The male member may include a ball rotatably received in a recess of the socket member. In a preferred embodiment of the invention as hereinafter described, the socket member has a slot along one side of the recess, and the slot has an enlargement permitting entry of the ball into the recess. The male member may have a head on one side of the ball which is rotatably received in the enlargement.

Preferably each rod section has a socket member on one end and a male member on the other end so that any number of control rod sections may be connected together.

One object of this invention is to provide a control rod adapted to be bundled with telecommunication cables to prevent the cables from being overbent, having the foregoing features and capabilities.

Another object is to provide a control rod which is composed of a relatively few simple parts, is rugged and durable in use, and can be inexpensively manufactured and easily installed.

These and other objects, features and advantages of the invention will become more apparent as the following description proceeds, especially when considered with the accompanying drawings.

BRIEF DESCRIPTION OF THE DRAWINGS

FIG. 1 is a fragmentary perspective view of a radius control rod constructed according to this invention, shown bundled with a plurality of telecommunication cables.

FIG. 2 is a fragmentary elevational view of the control rod, with parts broken away.

FIG. 2A is a view of a portion of the control rod within the loop 2A in FIG. 2.

FIG. 3 is an elevational view of one of the sections of the control rod.

FIG. 4 is a view of one end of a control rod section, taken on the line 4—4 in FIG. 3.

FIG. 5 is a view of the other end of the control rod section, taken on the line 5—5 in FIG. 3.

FIG. 6 is an enlarged fragmentary view of a mid-portion of the central rod section in FIG. 3.

FIG. 7 is a sectional view taken on the line 7—7 in FIG. 6.

FIG. 8 is a sectional view taken on the line 8—8 in FIG. 6.

FIG. 9 is a sectional view taken on the line 9—9 in FIG. 2.

DETAILED DESCRIPTION OF THE PREFERRED EMBODIMENT

Referring now more particularly to the drawings, there is shown in FIGS. 1–3 a plurality of elongated, flexible telecommunication cables 10 held together in a bundle by a length of binding tape 12 of a flexible control rod assembly 13. The telecommunication cables 10 may, for example, be fiber optic cables. Included in the control rod assembly 13 is an elongated, flexible radius control rod 14 extending generally lengthwise of the telecommunication cables.

The control rod 14 may include two or more flexible control rod sections 16, 18 and 20. Each control rod section includes a plurality of beads 22 arranged in a linear series. The beads 22 are each generally elongated members connected end-to-end and unitarily by flexible webs 24, as best shown in FIG. 2A.

Each bead has a straight central axis and its outer surface is a surface of revolution about that central axis. Each bead has identical end portions 26 and a mid-portion 30. Each end portion 26 where it joins the mid-portion is circular as indicated at 32, and curves therefrom in a convex arc and merges into a connecting web 24. The webs are of small cross-section in comparison with the beads and are integral and formed of one piece with the beads. The mid-portion 30 of each bead is concave and of reduced diameter relative to the end portions 26, thereby forming a continuous or circular depression 31. The mid-portions 30 of the beads are of reduced diameter to receive and center a winding 33 of the spiraling tape 12 which may be wrapped or coiled around the bundle of telecommunication cables, with each winding of the tape extending through the depressions 31 formed by the mid-portions, as best shown in FIG. 1.

Referring to FIGS. 3–9, there is a socket member 40 at one end of each control rod section, and a male member 42 at the opposite end. Each socket member 40 is an elongated tubular member which is open at the outer end and integrally connected at the opposite inner end to an end bead 22 by a web 24. The wall of the socket member 40 has an elongated, longitudinally extending slot 44 extending from the outer end of the socket member to a point near its inner end. The slot 44 has a circular enlargement 45 near the outer end of the socket member. The circular enlargement 45 opens into a semi-ball shaped recess 46 in the hollow interior of the socket member, as best shown in FIG. 8.

The male member 42 includes a ball 47 of slightly larger diameter than the circular enlargement 45 in the slot 44 of the socket member. The ball 47 is integrally connected to one of the end beads 22 by one of the webs 24. The ball is capable of being pressed into the recess 46 within the hollow interior of the socket member through the circular enlargement 45. The socket member 40 is sufficiently flexible to enable the enlargement 45 to expand and permit the ball 47 to pass through the enlargement and into the recess 46. The slot 44 at the outer end of the male member is wide enough to accommodate the end web 24 when the ball 47 is within the recess 46.

Referring to FIGS. 8–9, the ball 47 has a circular head 60 on one side which is of the same diameter as the enlargement 45 and is received in the enlargement after the ball has been forced into the recess 46.

The control rod sections 16, 18 and 20 are preferably made of a suitable resinous material such as polypropylene which is stretchable, compressible and flexible.

The control rod 14 may consist of only one control rod section or two or more control rod sections depending upon the length of the cables in the bundle.

The control rod sections may be easily connected together end-to-end by pressing the ball 47 of the male member 42 of one control rod section into the recess 46 of the socket member 40 of an adjacent control rod section. The control rod sections may be just as easily separated from one another.

FIGS. 2 and 2A show how far a control rod section can be bent, that is, the predetermined minimum radius to which it can be bent. The minimum is preferably about 25 mm. The ends of adjacent beads contact one another as in FIG. 2A when the control rod section is bent to its limit. The size and shape of the beads 22 and of the interconnecting webs 24 determine this limit. By wrapping a control rod with a bundle of cables, the minimum bending radius of the entire bundle is similarly limited.

What is claimed is:

1. A flexible control rod assembly adapted to be bundled with a plurality of telecommunication cables to prevent the cables from being bent to less than a predetermined radius, said control rod assembly comprising:

a flexible control rod having a plurality of elongated beads arranged end-to-end in a linear series, and a plurality of webs, each one of the plurality of webs interconnecting adjacent respective beads of the plurality of beads, wherein said plurality of beads and said plurality of webs are constructed so as to prevent bending of said control rod to less than a predetermined radius; and a tape constructed and arranged to spiral about the plurality of telecommunication cables and the control rod, the tape having a plurality of windings, each one of the plurality of windings being engaged to each one of the plurality of beads.

2. The control rod assembly as defined in claim 1, wherein said beads are engaged unitarily to said plurality of webs.

3. The control rod assembly as defined in claim 2, wherein each one of said plurality of beads has a mid-portion, a circular depression, and two end portions, the mid-portion defining the circular depression and disposed between the two end portions, each one of the plurality of windings disposed tangentially through the depression of each one of the plurality of beads and engaged to and centered by the mid-portion.

4. A control rod assembly adapted to be bundled with a plurality of telecommunication cables to prevent the cables from being bent to less than a predetermined radius, said control rod section comprising:

a plurality of elongated beads arranged end-to-end in a linear series, and a plurality of webs, each one of the plurality of webs interconnecting adjacent respective beads of the plurality of beads;

a socket member on an end of said control rod section engaged to an adjacent one of the plurality of beads by one of the plurality of webs; and a male member on an opposite end of said control rod section engaged to an adjacent one of the plurality of beads by one of the plurality of webs, wherein the male member is capable of being releasably secured to an identical second socket member of a second control rod section.

5. The control rod assembly as defined in claim 4, wherein said male member includes a ball and said socket member has a recess in which said ball is rotatably received.

6. The control rod assembly as defined in claim 5, wherein said socket member has a slot along one side communicating with said recess, said slot having an enlargement permitting entry of said ball into said recess.

7. The control rod assembly as defined in claim 6, wherein said male member includes a head on one side of said ball, said head being rotatably received in said enlargement.

8. The control rod assembly as defined in claim 7, wherein said predetermined radius is about 25 mm.

9. The control rod assembly as defined in claim 7, further comprising:

a tape constructed and arranged to spiral about the plurality of telecommunication cables and the control rod, the tape having a plurality of windings, each one of the plurality of windings being engaged to each one of the plurality of beads; and each one of said plurality of beads having a mid-portion, a circular depression, and two end portions, the mid-portion defining the circular depression and disposed between the two end portions, each one of the plurality of windings disposed tangentially through the depression of each one of the plurality of beads and engaged to and centered by the mid-portion.

\* \* \* \* \*